US011921497B2

(12) United States Patent
Anand et al.

(10) Patent No.: US 11,921,497 B2
(45) Date of Patent: *Mar. 5, 2024

(54) ZERO FOOTPRINT ROBOTIC PROCESS AUTOMATION SYSTEM

(71) Applicant: Automation Anywhere, Inc., San Jose, CA (US)

(72) Inventors: Virinchipuram J. Anand, San Ramon, CA (US); James Dennis, San Jose, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/126,935

(22) Filed: Mar. 27, 2023

(65) Prior Publication Data
US 2023/0236585 A1 Jul. 27, 2023

Related U.S. Application Data

(63) Continuation of application No. 16/398,532, filed on Apr. 30, 2019, now Pat. No. 11,614,731.

(51) Int. Cl.
*G06F 9/455* (2018.01)
*B25J 9/16* (2006.01)
(Continued)

(52) U.S. Cl.
CPC ........ *G05B 19/41865* (2013.01); *B25J 9/163* (2013.01); *G06F 9/4843* (2013.01); *G06F 11/362* (2013.01); *G05B 2219/50391* (2013.01)

(58) Field of Classification Search
CPC .......... G06F 21/57; G06F 8/70; G06F 9/4843; G06F 9/5005; G06F 9/5072; G06F 21/31;
(Continued)

(56) References Cited

U.S. PATENT DOCUMENTS 5,949,999 A 9/1999 Song et al.
5,983,001 A 11/1999 Boughner et al.
(Continued)

FOREIGN PATENT DOCUMENTS

WO 2022/076488 4/2022

OTHER PUBLICATIONS

Al Sallami, Load Balancing in Green Cloud Computation, Proceedings of the World Congress on Engineering 2013 vol. II, WCE 2013, 2013, pp. 1-5 (Year: 2013).
(Continued)

*Primary Examiner* — Thuy Dao

(57) ABSTRACT

Computerized RPA methods and systems that increase the flexibility and lower the cost with which RPA systems may be deployed are disclosed herein. In one embodiment, an RPA system and method avoids the need for preinstalled RPA software on a device employed by a user to create and/or execute software robots to perform RPA. In another embodiment, an RPA system and method provides a capability to execute software robots that may have been encoded in one or more programming languages to execute on an operating system different than that employed by a server of the RPA system.

22 Claims, 13 Drawing Sheets

(51) Int. Cl.
  *G05B 19/418* (2006.01)
  *G06F 9/48* (2006.01)
  *G06F 9/50* (2006.01)
  *G06F 11/34* (2006.01)
  *G06F 11/36* (2006.01)
  *G06F 16/13* (2019.01)

(58) Field of Classification Search
  CPC .......... G06F 21/554; G06F 11/362; G05B 19/41865; G05B 2219/50391; B25J 9/163
  See application file for complete search history.

(56) References Cited

U.S. PATENT DOCUMENTS

| | | |
|---|---|---|
| 6,133,917 A | 10/2000 | Feigner et al. |
| 6,226,407 B1 | 5/2001 | Zabih et al. |
| 6,389,592 B1 | 5/2002 | Ayres et al. |
| 6,427,234 B1 | 5/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Folev |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 9,032,314 B2 | 5/2015 | Mital et al. |
| 9,104,294 B2 | 8/2015 | Forstall et al. |
| 9,213,625 B1 | 12/2015 | Schrage |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,934,063 B2* | 4/2018 | Kania .................. G06F 9/485 |
| 9,946,233 B2 | 4/2018 | Brun et al. |
| 9,990,347 B2 | 6/2018 | Raskovic et al. |
| 10,043,255 B1 | 8/2018 | Pathapati et al. |
| 10,282,280 B1 | 5/2019 | Gouskova |
| 10,706,218 B2 | 7/2020 | Milward et al. |
| 11,176,443 B1 | 11/2021 | Selva |
| 11,182,178 B1 | 11/2021 | Singh et al. |
| 11,614,731 B2 | 3/2023 | Anand et al. |
| 2003/0033590 A1 | 2/2003 | Leherbauer |
| 2003/0101245 A1 | 5/2003 | Srinivasan et al. |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2007/0101291 A1 | 5/2007 | Forstall et al. |
| 2007/0112574 A1 | 5/2007 | Greene |
| 2007/0156677 A1 | 7/2007 | Szabo |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2008/0301649 A1* | 12/2008 | Stall .................. G06F 11/3664 717/134 |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0023602 A1 | 1/2010 | Marlone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Folev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0310625 A1* | 12/2012 | Wei .................. G06F 11/3688 704/8 |
| 2012/0324333 A1 | 12/2012 | Lehavi |
| 2012/0330940 A1 | 12/2012 | Caire et al. |
| 2013/0145006 A1* | 6/2013 | Tammam .............. G06F 9/5027 709/223 |
| 2013/0173648 A1 | 7/2013 | Tan et al. |
| 2013/0290318 A1 | 10/2013 | Shapira et al. |
| 2014/0036290 A1 | 2/2014 | Miyagawa |
| 2014/0045484 A1 | 2/2014 | Kim et al. |
| 2014/0181705 A1 | 6/2014 | Hey et al. |
| 2015/0082280 A1 | 3/2015 | Betak et al. |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0078368 A1 | 3/2016 | Kakhandiki et al. |
| 2017/0270431 A1 | 9/2017 | Hosabettu |
| 2018/0113781 A1 | 4/2018 | Kim |
| 2018/0275835 A1 | 9/2018 | Prag |
| 2019/0028587 A1 | 1/2019 | Unitt |
| 2019/0095440 A1* | 3/2019 | Chakra ............... G06F 16/1734 |

(56) References Cited

U.S. PATENT DOCUMENTS

| | | | |
|---|---|---|---|
| 2019/0126463 A1 | 5/2019 | Purushothaman | |
| 2019/0141596 A1 | 5/2019 | Gay | |
| 2019/0188462 A1 | 6/2019 | Nishida | |
| 2019/0317803 A1 | 10/2019 | Maheshwari | |
| 2019/0324781 A1 | 10/2019 | Ramamurthy | |
| 2019/0340240 A1 | 11/2019 | Duta | |
| 2020/0159648 A1* | 5/2020 | Ghare | G06F 9/4411 |
| 2022/0245936 A1 | 8/2022 | Valk | |

OTHER PUBLICATIONS

B.P. Kasper "Remote: A Means of Remotely Controlling and Storing Data from a HAL Quadrupole Gass Analyzer Using an IBM-PC Compatible Computer", Nov. 15, 1995, Space and Environment Technology Center.

Bergen et al., RPC automation: making legacy code releant, May 2013, 6 pages.

Hu et al., Automating GUI testing for Android applications, May 2011, 7 pages.

Konstantinou et al., An architecture for virtual solution composition and deployment in infrastructure clouds, 9 pages (Year: 2009).

Nyulas et al., An Ontology-Driven Framework for Deploying JADE Agent Systems, 5 pages (Year: 2006).

Tom Yeh, Tsung-Hsiang Chang, and Robert C. Miller, Sikuli: Using GUI Screenshots for Search and Automation, Oct. 4-7, 2009, 10 pages.

Yu et al., Deplying and managing Web services: issues, solutions, and directions, 36 pages (Year: 2008).

Zhifang et al., Test automation on mobile device, May 2010, 7 pages.

Non-Final Office Action for U.S. Appl. No. 17/230,492, dated Oct. 14, 2022.

Notice of Allowance for U.S. Appl. No. 16/398,532, dated Oct. 23, 2022.

Non-Final Office Action for U.S. Appl. No. 16/876,530, dated Sep. 29, 2020.

Final Office Action for U.S. Appl. No. 16/876,530, dated Apr. 13, 2021.

Notice of Allowance for U.S. Appl. No. 16/876,530, dated Jul. 22, 2021.

Dai, Jifeng et al., "R-fcn: Object detectiom via region-based fully convolutional networks", Advances in neural information processing systems 29 (2016). (Year: 2016).

Ren, Shaoqing et al., "Faster r-cnn: Towards real0time object detection with region proposal network." Advances in neutral information processing systems 28 (2015). (Year: 2015).

International Search Report for PCT/US2021/053669, dated May 11, 2022.

Embley et al., "Table-processing paradigms: a research survey", International Journal on Document Analysis and Recognition, vol. 8, No. 2-3, May 9, 2006, pp. 66-86.

Non-Final Office Action for U.S. Appl. No. 16/925,956, dated Sep. 16, 2021.

Notice of Allowance for U.S. Appl. No. 16/925,956, dated Jan. 7, 2022.

Pre-Interview Office Action for U.S. Appl. No. 16/398,532, dated Jul. 8, 2022.

Notice of Allowance for U.S. Appl. No. 16/398,532, dated Jul. 8, 2022.

\* cited by examiner

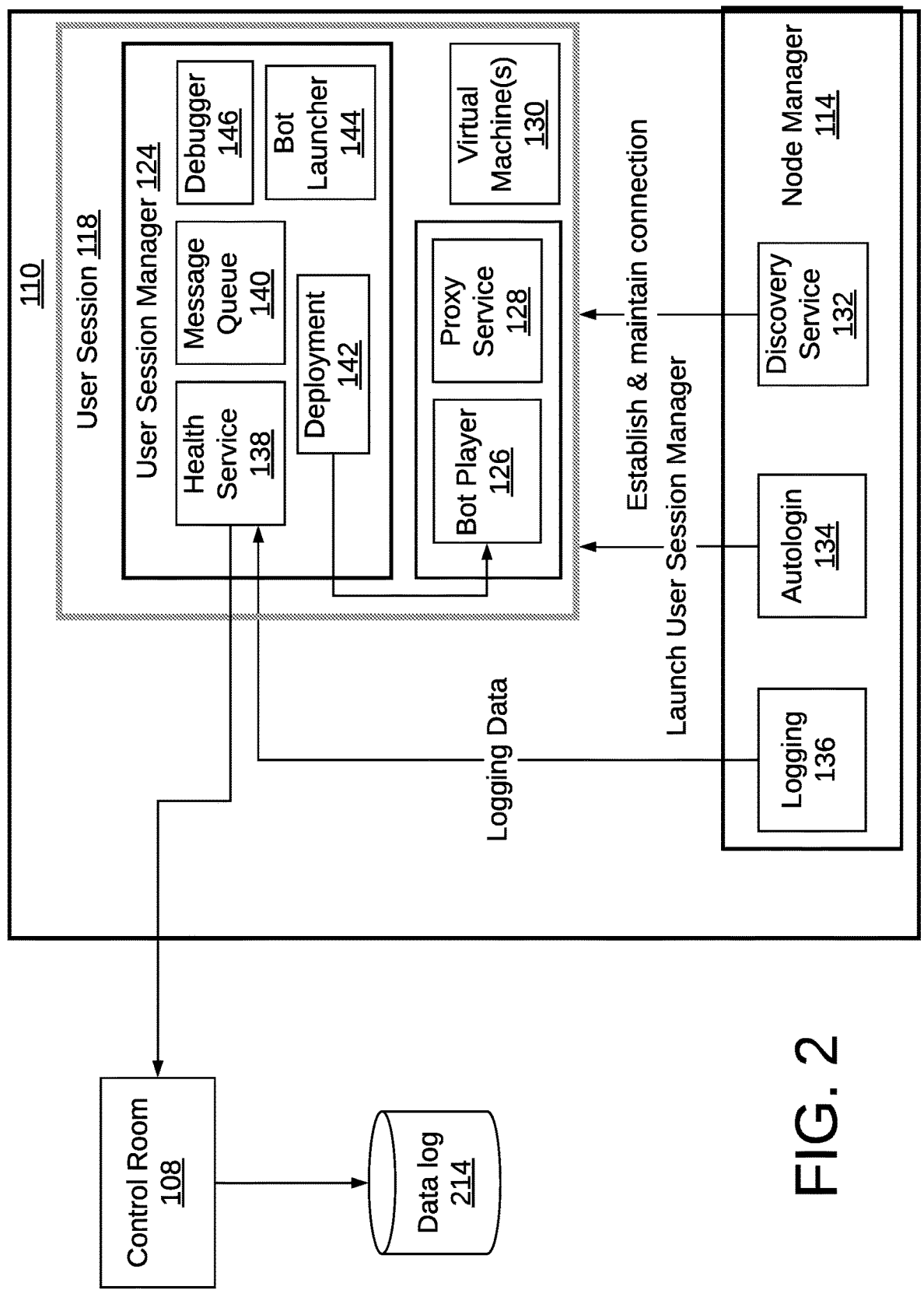

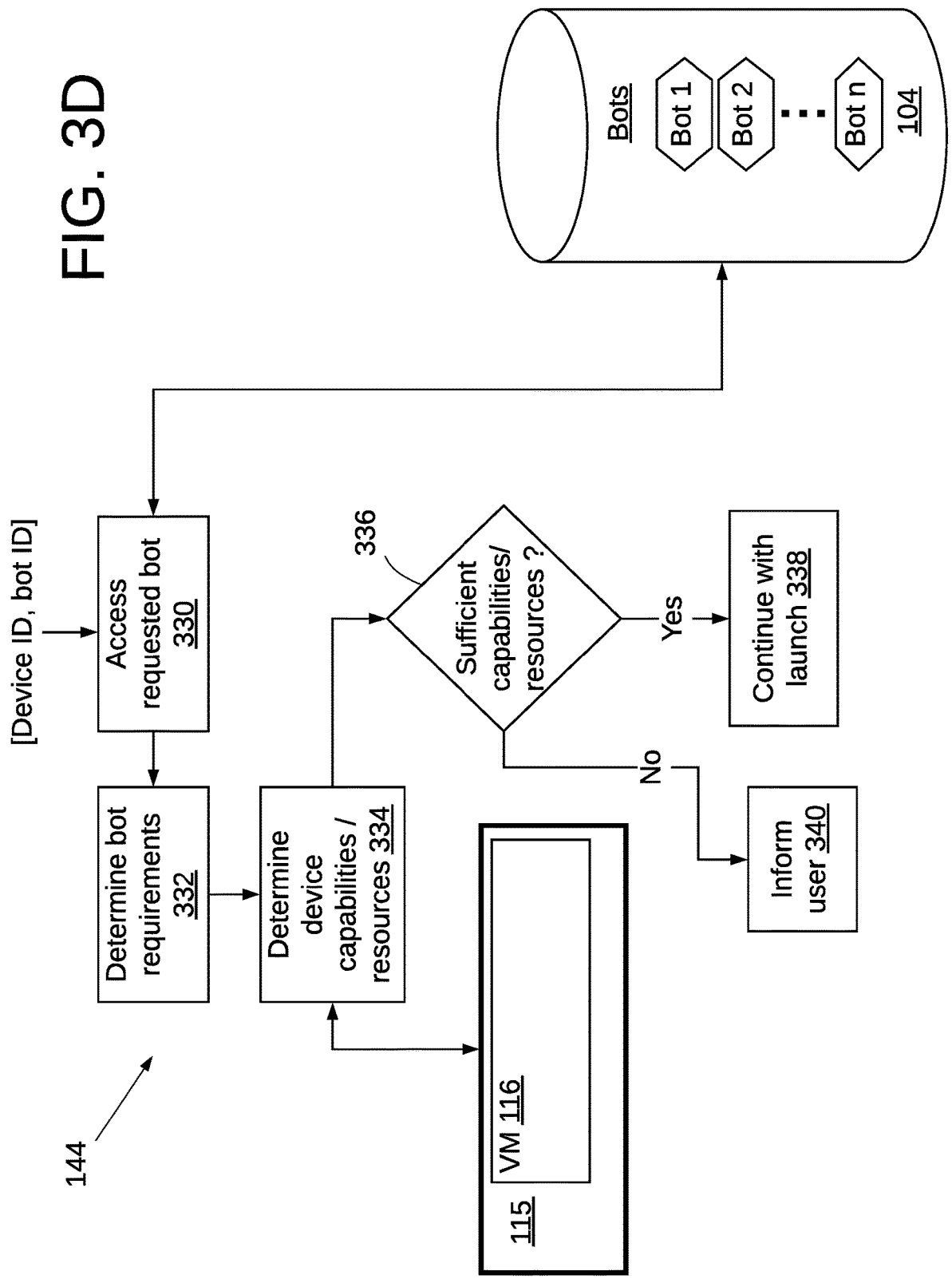

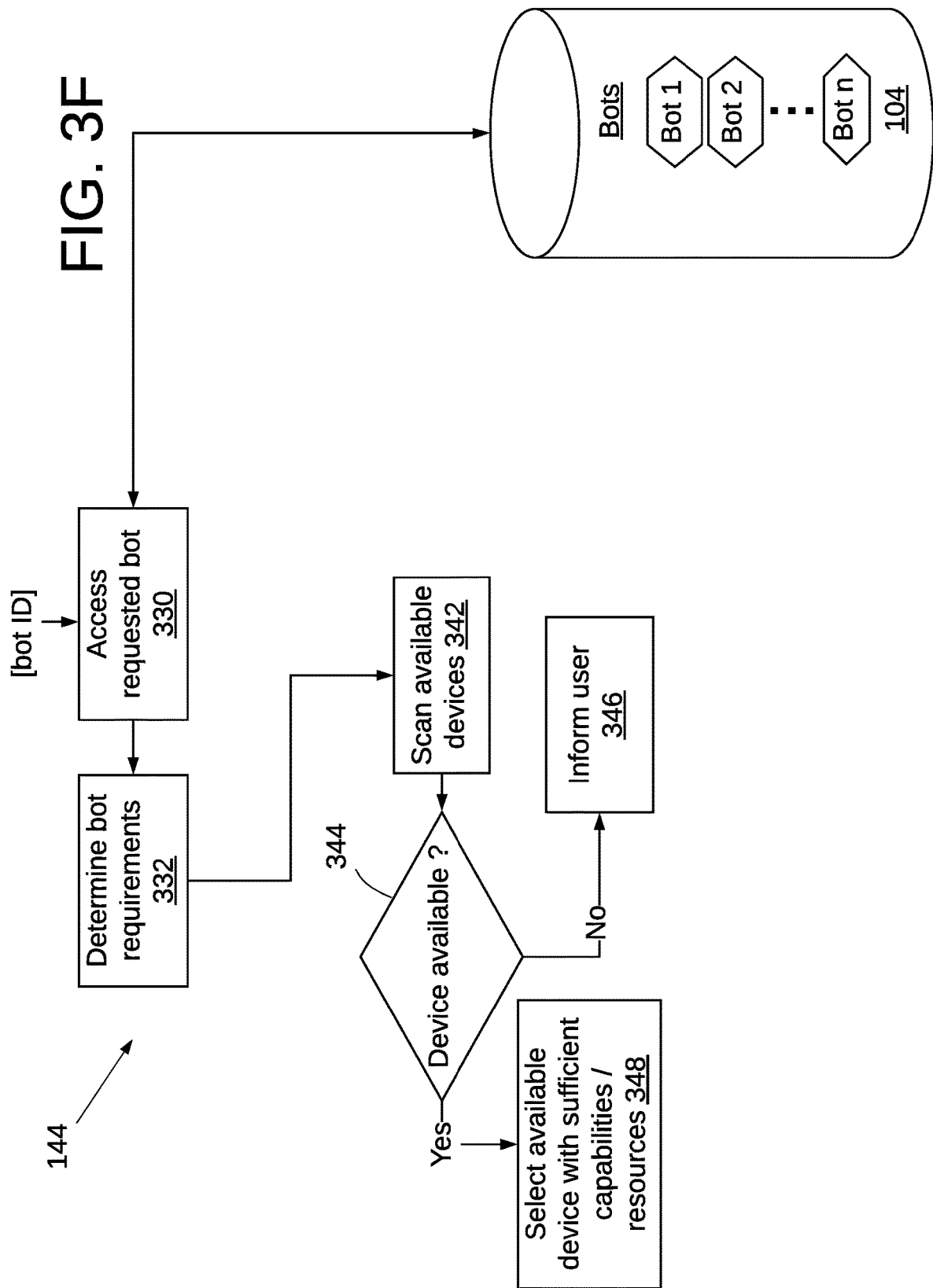

ZERO FOOTPRINT ROBOTIC PROCESS AUTOMATION SYSTEM

RELATED APPLICATIONS

This application is a continuation of U.S. application Ser. No. 16/398,532, filed Apr. 30, 2019, and entitled "ZERO FOOTPRINT ROBOTIC PROCESS AUTOMATION SYSTEM," which is hereby incorporated herein by reference in its entirety.

This application is related to U.S. patent application Ser. No. 16/398,600, filed Apr. 30, 2019, and entitled "PLATFORM AGNOSTIC ROBOTIC PROCESS AUTOMATION," which is assigned to the assignee of the present application.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure computer software, known as a "robot" to capture and interpret existing applications for processing a transaction, manipulating data, triggering responses and communicating with other digital systems. The software robots in conventional RPA systems employ the software robots to interpret the user interface of third-party applications and to execute steps identically to a human user. For example, many tasks within organizations require individuals to perform the same repetitive tasks, such as entering data from invoices into an enterprise accounts payable application or entering data from a loan application into a loan processing system. RPA permits the automation of such application level repetitive tasks via software robots that are coded to repeatedly and accurately perform the repetitive task.

The software robots in conventional RPA systems execute on devices, physical or virtual, that are separate from an RPA server and which contain software to permit creation and/or execution of the software robot. While this has proven to be highly beneficial in facilitating data processing, the requirement for bot creation/execution software to be loaded onto different devices increases administrative complexity and can limit the processing capability of the RPA system. Moreover, because the software robots operate at an application level, as a human user would engage with such applications, conventional RPA systems are operating system dependent. A software robot encoded to perform tasks on, for example, a Windows® operating system, will need to be executed to perform the tasks for which it has been encoded on the Windows® operating system. This limitation can limit the scalability and increase the cost of deployment of an RPA system.

SUMMARY

Computerized RPA methods and systems that increase the flexibility and lower the cost with which RPA systems may be deployed are disclosed herein. In one embodiment, an RPA system and method avoids the need for preinstalled RPA software on a device employed by a user to create and/or execute software robots to perform RPA. In such an embodiment, an RPA system includes data storage which stores a plurality of sets of task processing instructions. Each set of task processing instructions implements a bot which is operable to interact at a user level with one or more designated user level application programs. The data storage also stores a plurality of work items, where each work item is stored for subsequent processing by executing a corresponding set of task processing instructions. A control room that operates as a server to manage operation of the RPA system is operatively coupled to the data storage and is configured to execute instructions that when executed cause the control room to respond to a request that is issued by a user of a client device to perform an automation task to process a work item from the plurality of work items. The control room provides to the client device, software code to implement a node manager that executes on the client device and which provides to the user a visual interface via a browser to view progress of and to control the automation task. The node manager initiates on the client device, a user session to perform the automation task. The set of task processing instructions that correspond to the work item are retrieved are executed under control of the user session, on the client device. The control room receives update data indicative of status of processing of the work item from the node manager.

In another embodiment, an RPA system and method provides a capability to execute software robots that may have been encoded to execute on an operating system different than that employed by a server of the RPA system. In such an embodiment, an RPA system includes data storage which stores a plurality of sets of task processing instructions. Each set of task processing instructions implements a bot which is operable to interact at a user level with one or more designated user level application programs. The data storage also stores a plurality of work items, where each work item is stored for subsequent processing by executing a corresponding set of task processing instructions. A control room that manages operation of the RPA system is operatively coupled to the data storage and is configured to execute instructions that when executed cause the control room to respond to a request that is issued by a user from a client device to perform an automation task to process a work item from the plurality of work items. The control room initiates on the server processor, or on another device other than the client device, within a virtual machine configured to execute computer programs written in a platform independent language and compiled to a bytecode executable by the virtual machine, a user session to perform the automation task. The set of task processing instructions that correspond to the work item is retrieved and is executed, under control of the user session, on the server processor or on another device other than the client device. The control room receives update data indicative of status of processing of the work item to the client device.

An advantage of embodiments disclosed herein is that creation and execution of bots is independent of the processing and platform constraints of the particular device the user is using. Moreover, in certain embodiments, creation and execution of bots is able to be independent of the underlying operating system platform. So a bot encoded with commands specific to a first operating system, such as Windows®, can be executed on a different operating system, such as Linux®.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2 illustrates commands exchanged between a client device and a server in the RPA system of FIG. 1.

FIGS. 3A, 3B, 3C, 3D, 3E and 3F illustrate operation of various modules of the RPA system of FIG. 1.

DETAILED DESCRIPTION

In the following detailed description, reference will be made to the accompanying drawings, in which identical functional elements are designated with like numerals. Elements designated with reference numbers ending in a suffix such as .1, .2, .3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
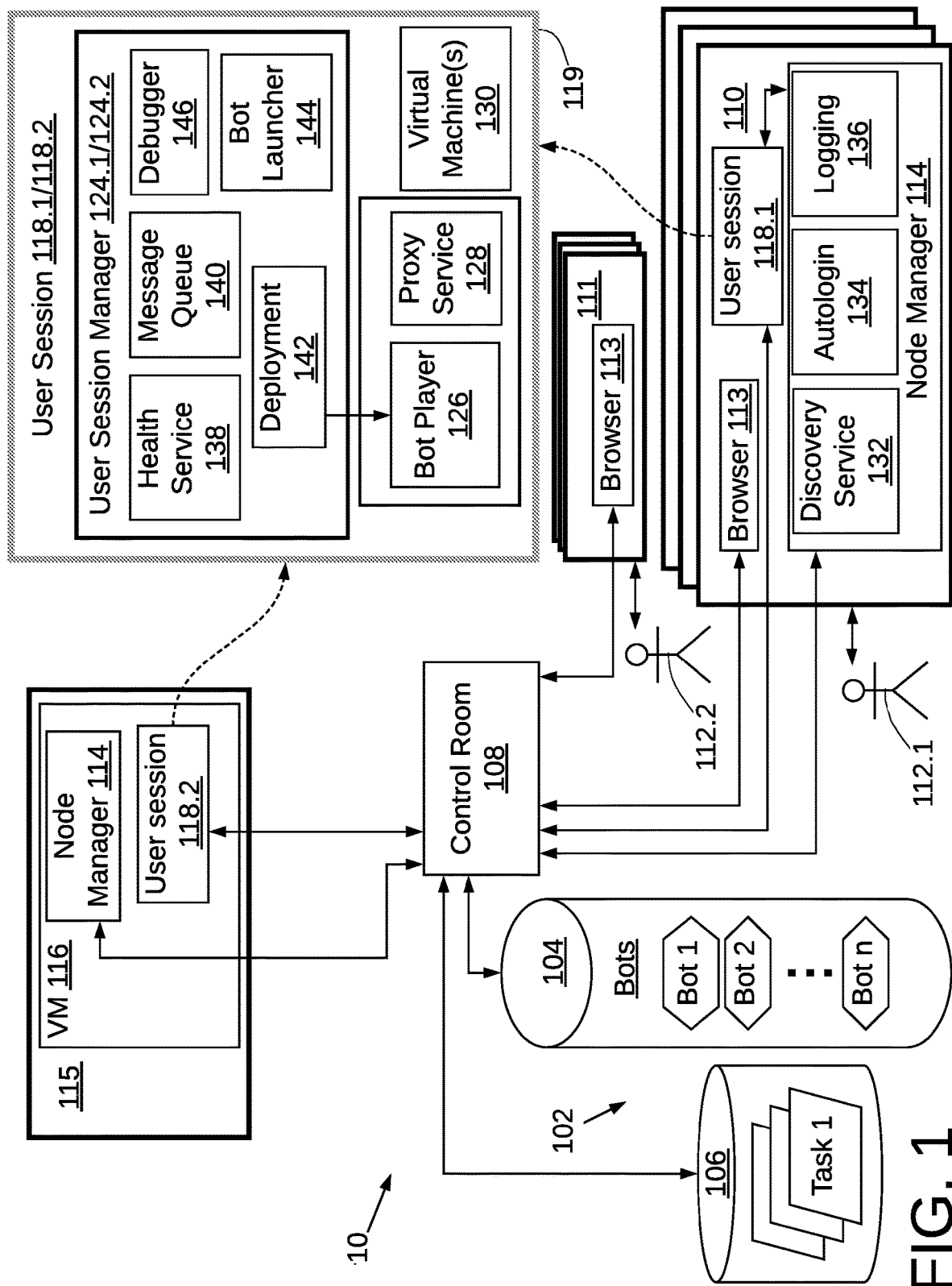
FIG. 1 is a high-level block diagram of an embodiment of an RPA system with server-based bot creation and execution.

In FIG. 1, the embodiments disclosed herein implement a robotic process automation system 10 that includes data storage, seen generally at 102 which stores a plurality of sets of task processing instructions 104. Each set of task processing instructions 104 implements a software robot, also referred to as a bot (seen as Bot 1, Bot 2, . . . , Bot n) which is operable to interact at a user level with one or more designated user level application programs (not shown). As used herein, the term "bot" is generally synonymous with the term software robot. In certain contexts, as will be apparent to those skilled in the art in view of the present disclosure, the term "bot runner" refers to a device (virtual or physical), having the necessary software capability (such as bot player 126), on which a bot will execute or is executing. The data storage 102 also stores a plurality of work items 106, where each work item 106 is stored for subsequent processing by executing a corresponding set of task processing instructions 104. A control room, seen generally at 108, is operatively coupled to the data storage 102 and is configured to execute instructions that when executed cause the RPA system 10 to respond to a request from a client device 110 that is issued by a user 112.1 to act as a server to provide to the client device 110 the capability to perform an automation task to process a work item from the plurality of work items 106. For simplicity of illustration and explanation, a single client device 110 is shown in detail. The RPA system 10 preferably is able to support multiple client devices 110 concurrently, each of which will have one or more corresponding user session(s) 118, which provides a context. The context includes security, permissions, audit trails, etc. to define the permissions and roles for bots operating under the user session 118. For example, a bot executing under a session, cannot access any files or use any applications that the user under whose credentials the bot is operating does not have permission to do so. This prevents any inadvertent or malicious acts from a bot under which a bot 104 executes.

The control room 108 provides to the client device 110, software code to implement a node manager 114 that executes on the client device 110 and which provides to a user 112 a visual interface via browser 113 to view progress of and to control execution of the automation task. It should be noted here that the node manager 114 is provided to the client device 110 on demand, when required by the client device 110 to execute a desired automation task. In one embodiment, the node manager 114 may remain on the client device 110 after completion of the requested automation task to avoid the need to download it again. In another embodiment, the node manager 114 may be deleted from the client device 110 after completion of the requested automation task. The node manager 114 also maintains a connection to the control room 108 to inform the control room 108 that device 110 is available for service by the control room 108, irrespective of whether a live user session 118 exists. When executing a bot 104, the node manager 114 impersonates the user 112 by employing credentials associated with the user 112. In certain embodiments, the system 10 employs user impersonation as described in U.S. Patent Application entitled ROBOTIC PROCESS AUTOMATION SYSTEM WITH DEVICE USER IMPERSONATION filed on Mar. 31, 2019, assigned application Ser. No. 16/371,046, which application is assigned to the assignee of the present application and which is hereby incorporated by reference in its entirety. In application Ser. No. 16/371,046 the term "bot runner" is used in the manner that the term "bot" is used in the present application.

The control room 108 initiates on the client device 110, a user session 118 (seen as a specific instantiation 118.1) to perform the automation task. The control room 108 retrieves the set of task processing instructions 104 that correspond to the work item 106. The task processing instructions 104 that correspond to the work item 106 execute under control of the user session 118.1, on the device 110. The node manager 114 provides update data indicative of status of processing of the work item to the control room 108. The control room 108 terminates the user session 118.1 upon completion of processing of the work item 106. User session 118.1 is shown in further detail at 119, where an instance 124.1 of user session manager 124 is seen along with a bot player 126, proxy service 128 and one or more virtual machine(s) 130, such as a virtual machine that runs Java® or Python®. The user session manager 124 provides a generic user session context within which a bot 104 executes.

The bots 104 execute on a player, via a computing device, to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference in its entirety.

Some or all of the bots 104 may in certain embodiments be located remotely from the control room 108. Moreover, the devices 110 and 111 may also be located remotely from the control room 108. The bots 104 and the tasks 106 are shown in separate containers for purposes of illustration but they may be stored in separate or the same device(s), or across multiple devices. The control room 108 performs user management functions, source control of the bots 104, along with providing a dashboard that provides analytics and results of the bots 104, performs license management of software required by the bots 104 and manages overall execution and management of scripts, clients, roles, credentials, and security etc. The major functions performed by the control room 108 include: (i) a dashboard that provides a summary of registered/active users, tasks status, repository details, number of clients connected, number of scripts passed or failed recently, tasks that are scheduled to be executed and those that are in progress; (ii) user/role management—permits creation of different roles, such as bot creator, bot runner, admin, and custom roles, and activation, deactivation and modification of roles; (iii) repository management—to manage all scripts, tasks, workflows and reports etc.; (iv) operations management—permits checking status of tasks in progress and history of all tasks, and permits the administrator to stop/start execution of bots currently executing; (v) audit trail—logs creation of all actions performed in the control room; (vi) task scheduler—permits scheduling tasks which need to be executed on different clients at any particular time; (vii) credential management—permits password management; and (viii) security: management—permits rights management for all user roles. The control room 108 is shown generally for simplicity of explanation. Multiple instances of the control room 108 may be employed where large numbers of bots are deployed to provide for scalability of the RPA system 10.

In the event that a device, such as device 111 (seen operated by user 112.2) does not satisfy the minimum processing capability to run node manager 114, the control room 108 provides on another device, such as device 115, that has the requisite capability, within a Virtual Machine (VM), seen as VM 116 that is resident on the device 115, a node manager 114 that is in communication with browser 113 on device 111. This permits RPA system 10 to operate with devices that may have lower processing capability, such as older laptops, desktops, and portable/mobile devices such as tablets and mobile phones. In certain embodiments browser 113 may take the form of a mobile application stored on the device 111. The control room 108 establishes a user session 118.2 for the user 1122 while interacting with the control room 108 and the corresponding user session 118.2 operates as described above for user session 118.1, with user session manager 124 as described above in connection with device 110.

In certain embodiments, the user session manager 124 provides five functions. First is a health service 138 that maintains and provides a detailed logging of bot execution including monitoring memory and CPU usage by the bot and other parameters such as number of file handles employed. The bots 104 employ the health service 138 as a resource to pass logging information to the control room 108. Execution of the bot is separately monitored by the user session manager 124 to track memory, CPU and other system information. The second function provided by the user session manager 124 is a message queue 140 for exchange of data between bots executed within the same user session 118. Third is a deployment service 142 that connects to the control room 108 to request execution of a requested bot 104. The deployment service 142 also ensures that the environment is ready for bot execution such as by making available dependent libraries. Fourth is a bot launcher 144 which reads metadata associated with a requested bot 104 and launches an appropriate container and begins execution of the requested bot. Fifth is a debugger service 146 that can be used to debug bot code.

The bot player 126 executes, or plays back, the sequence of instructions encoded in a bot. The sequence of instructions is captured by way of a recorder when a human performs those actions, or alternatively the instructions are explicitly coded into the bot. These instructions enable the bot player 126, to perform the same actions as a human would do in their absence. The instructions are composed of a command (action) followed by set of parameters, for example: Open Browser is a command, and a URL would be the parameter for it to launch the site. Proxy service 128 enables the integration of external software or applications with the bot to provide specialized services. For example, an externally hosted artificial intelligence system could enable the bot to understand the meaning of a "sentence"

The user 112 interacts with node manager 114 via a conventional browser 113 which employs the node manager 114 to communicate with the control room 108. When for the first time 112 user logs from client device 110 onto the control room 108, they are prompted to download and install the node manager 114 on the device 110, if one is not already present. The node manager 114 establishes a web socket connection to the user session manager 124, deployed by the control room 108 that lets the user 112 subsequently create, edit and deploy the bots 104.

The node manager 114 which is provided to the device 110 by the control room 108, in certain embodiments provides three functions, as illustrated in FIG. 2. First is a discovery service 132 that establishes and maintains a connection to the control room 108 and acts as a resource to the control room 108 for the device 110. Second, the node manager 114 provides an autologin service 134 that provides a vehicle to allow the control room 108 to login or to create a user session 118 by launching user session manager 124 which works with the control room 108 to serve control room requests. Third, the node manager 212 provides a logging function 136 to provide a single, centralized point for streaming of all logging data back to the control room 108, via the health service 138, which stores the received log data to a data log 214.

Figure 3A:
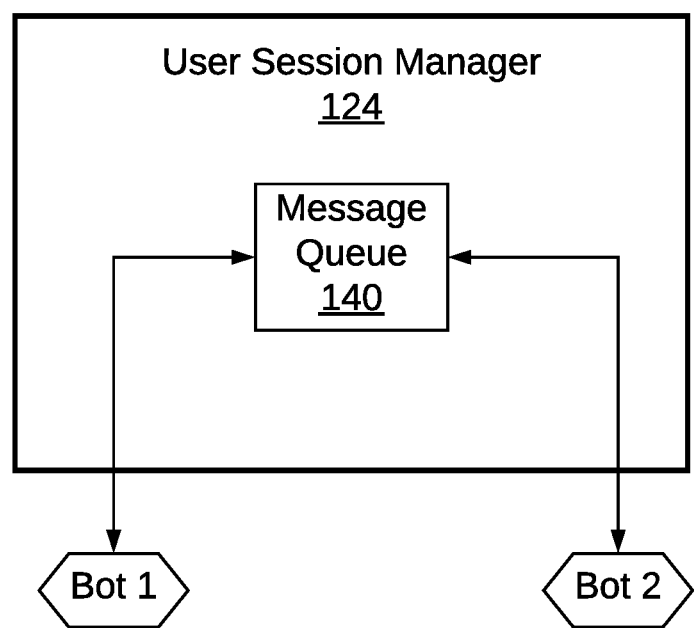

Operation of the message queue 140 is illustrated in FIG. 3A. The basic exchange of data between bots, Bot 1 and Bot 2, that that are executed within the same user session is performed using message queue 140. Furthermore, the message queue 140 can be used as the mechanism to synch-up between different code blocks or between parallel execution of bots in the same user session. In one embodiment, there is no persistence of queue data, once the user session is killed, the queue is lost. In such an embodiment, for more long-term and exchange of data across different user sessions or between bots across different client devices 110, alternative messaging may be employed such as by use of JavaScript Object Notation (JSON objects).

Figure 3B:
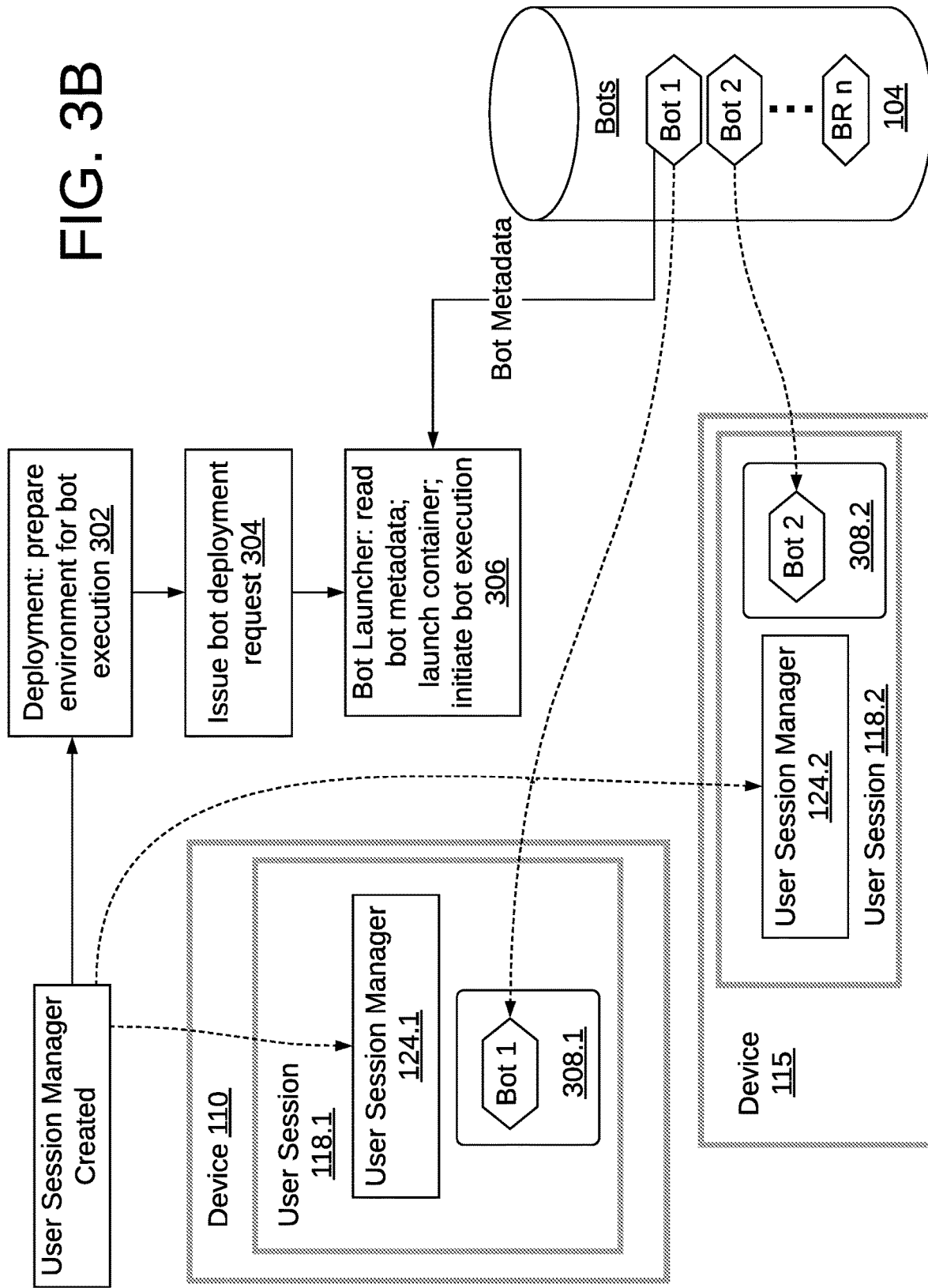

Initiation of execution of a bot 104 is illustrated in FIG. 3B which shows two user sessions (118.1, 118.2) created on two devices. User session managers 124.1 and 124.2 at 301 initiate, in devices 110 and 115 respectively, user sessions 118.1 and 118.2, under control of deployment module 142, for bot execution. The deployment module 142 at 302 prepares the user session 118 for execution by setting up the environment needed for the bot execution. This includes setting up appropriate path variables, that the bot may call upon while executing. This ensures that all dependencies, like external libraries, are available for the bot to execute. At 304 the bot deployment module 142 issues bot deployment requests to the control room 108. The control room 108 responds by retrieving the requested bot, Bot 1 and providing it to user session manager 124.1 which is executing on device 110. In the case of device 111 which does not have the capability to execute the node manager 114, another device is selected, device 115 in this case, upon which the node manager will execute to permit the user session manager 124 to initiate user session 118.2 to execute Bot 2. At 306, the bot launcher 144 in user session manager 118.1 reads the metadata for Bot 1 and launches a container 308.1 within which Bot 1 will execute, and then initiates execution of Bot 1. Similar actions are performed by a bot launcher executing within user session 118.2 on device 304 to initiate execution of Bot 2.

Figure 3C:
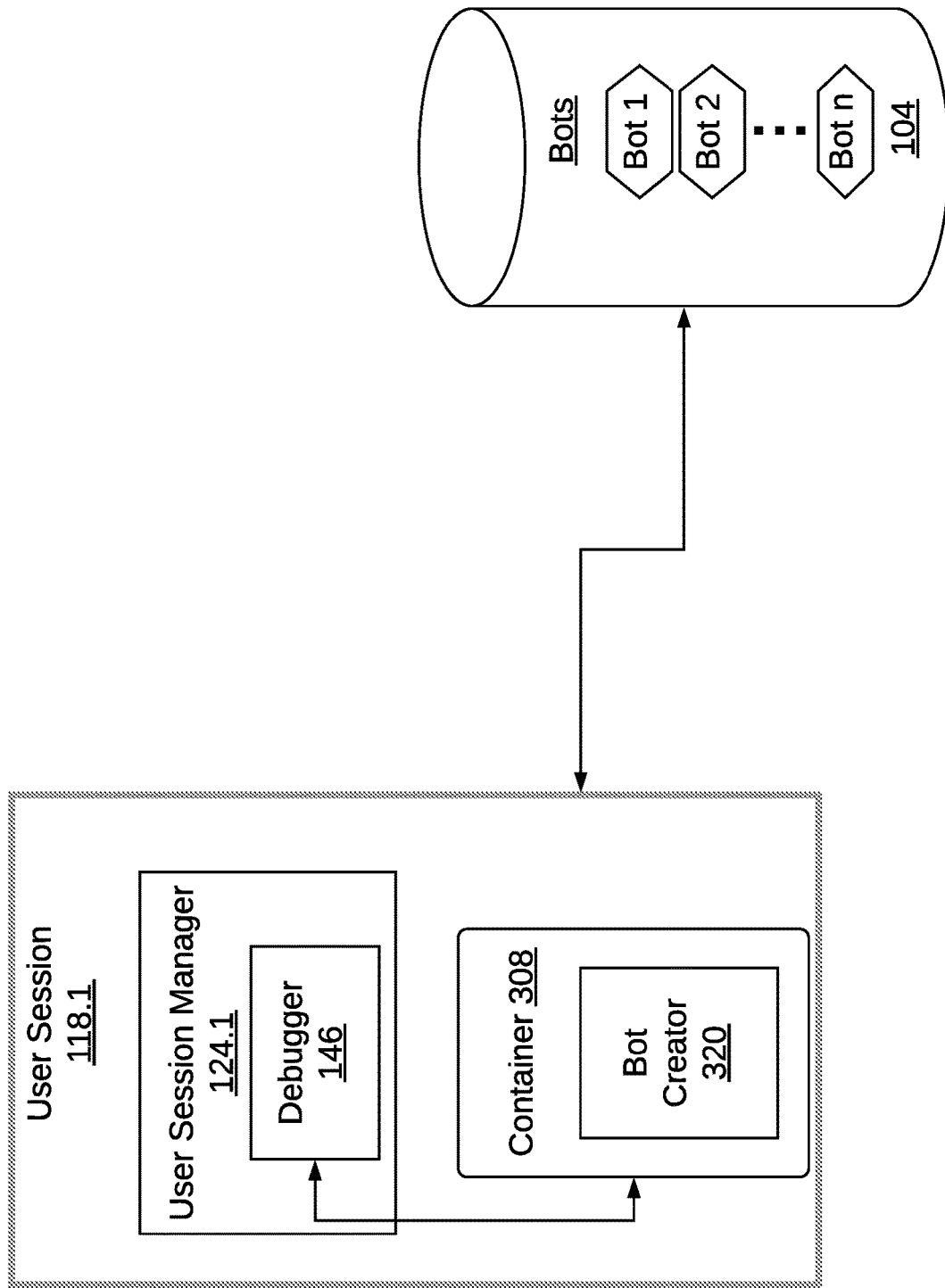

Operation of the debugger 146 is seen in FIG. 3C. If the user 112 is logged into the control room 108 as a bot creator employing a bot creator 320, they may debug with debugger 146 the code of a selected bot 104. The debugger 146 enables the bot creator to step-through the instructions in the bot and ensure that it is working as designed or created. The debugger 146 interactively provides the state of various variables, input and output parameters, allowing the creator to fix any errors discovered during the bot testing.

Figure 3E:
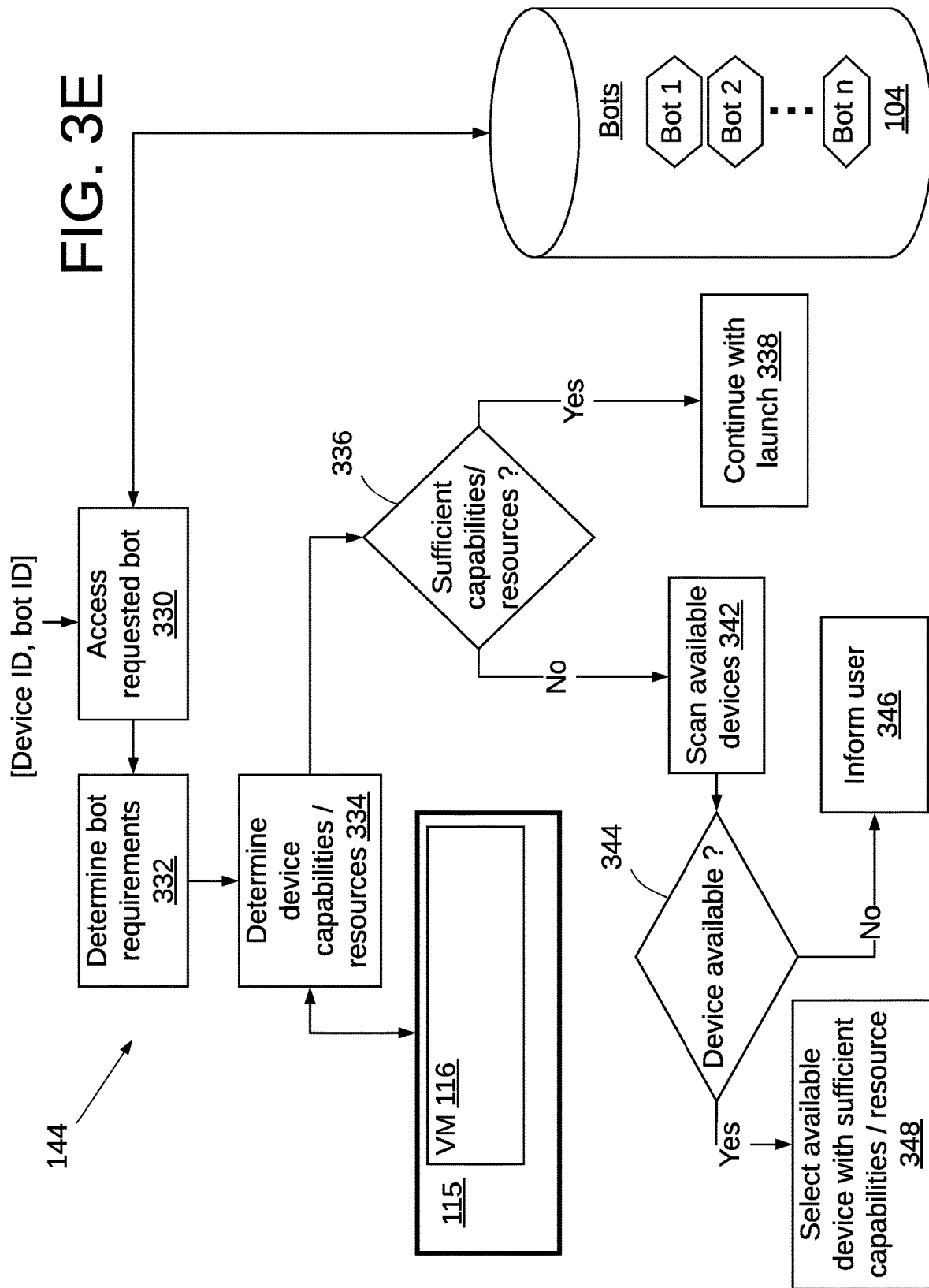

FIGS. 3D, 3E and 3F are flow diagrams illustrating operation of certain aspects of three embodiments of bot launcher 144. In FIG. 3D, the bot launcher 144, upon receiving an identifier for a bot 104 requested by user 112 (such as for example Bot 1) and an identifier for a device requested by user 112, accesses at 330 the requested bot to identify at 332 requirements encoded within the requested bot that specify capabilities and resources required for the requested bot to execute its programmed instructions. The capabilities and resources may be explicitly identified within the requested bot and/or the bot launcher 144 may scan the coding in the requested bot to automatically determine some or all of the required capabilities and resources, Capabilities and resources required by the bot 104 mayinclude minimum processing, storage, communications capabilities, access to required services, such as hosted applications (e.g. various enterprise resource planning or customer relationship management applications), various files that may be required, and application programs that may be required to be installed such as for example, Microsoft Office® applications (Word®, Excel®, Outlook®, Powerpoint®). Capabilities and resources, as just described, of the requested device are determined at 334. If the capabilities/resources of the requested device are determined at 336 to be sufficient to execute the requested bot the bot launcher 144 continues with other required operations to launch the requested bot. Otherwise, the user 112 is notified at 340 so that another device may be requested.

FIG. 3E illustrates operation of another embodiment of bot launcher 144 where the bot launcher 144, automates the process of identifying an available device with the capabilities/resources required by a requested bot. At 336, if the requested device does not have the required capabilities/resources then at 342, the bot launcher performs a scan of available devices as maintained by control room 108. If any devices are not currently available, the user 112 is informed at 346. If at 344 it is determined that one or more devices with sufficient capabilities/resources is/are currently available, the bot launcher 144 selects one of such devices at 348 and the bot launcher 144 continues with other required operations to launch the requested bot.

FIG. 3F illustrates operation of another embodiment of bot launcher 144 where the bot launcher 144, fully automates the process of identifying an available device with the capabilities/resources required by a requested bot. In FIG. 3F, the bot launcher receives at 330 only the identification of the requested bot and identifies, at operations 342, 344 and 348, an available device with sufficient capabilities/resources. In the embodiments of FIGS. 3D, 3E and 3F the devices scanned and selected may be physical devices and/or virtual devices such as described below in connection with FIG. 4.

Figure 4:
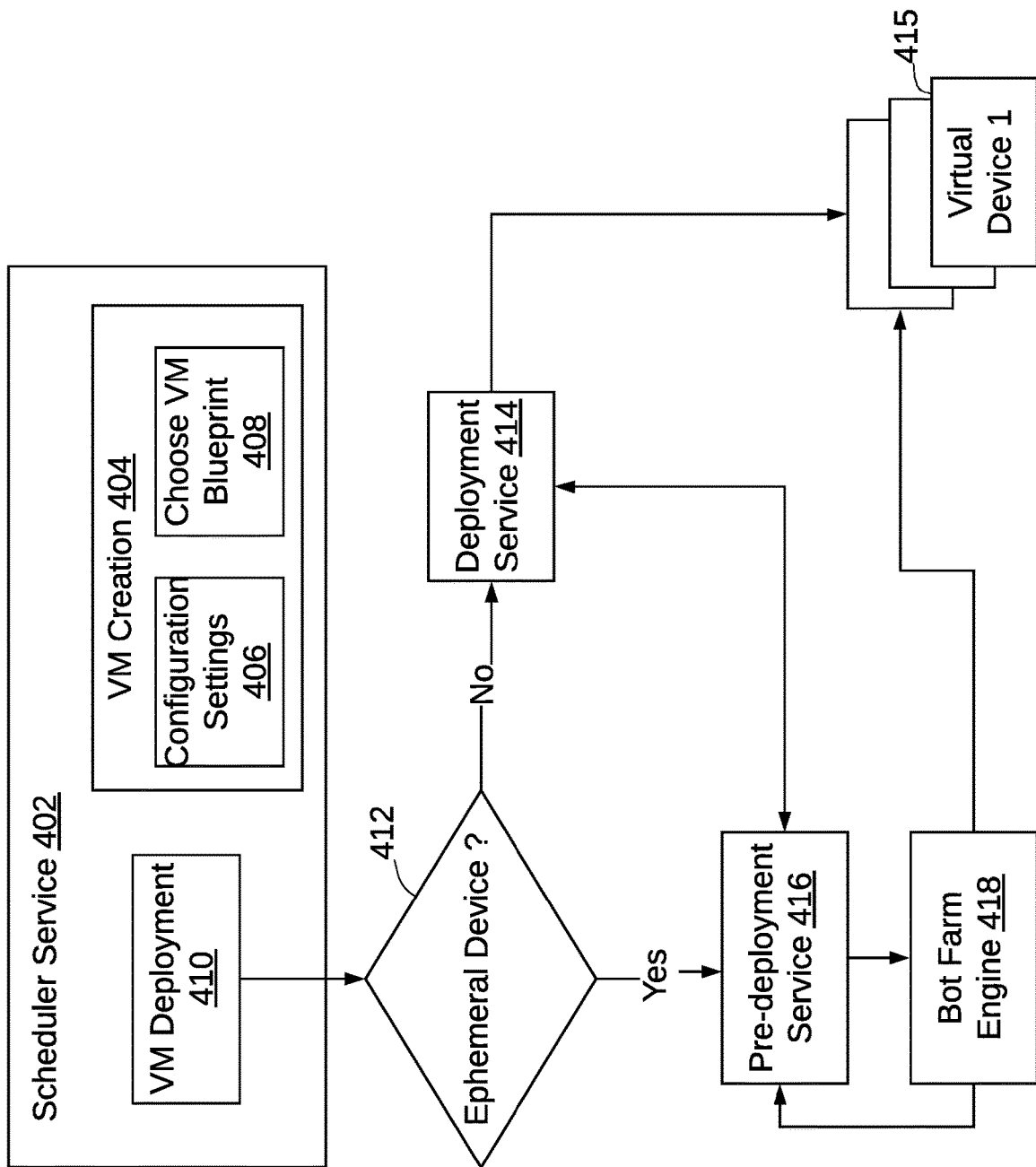
FIG. 4 illustrates a bot farm service that may be used in connection with the RPA system of FIG. 1.

FIG. 4 illustrates a bot farm service that maybe used in connection with the RPA system of FIG. 1 to employ virtualization to provide larger scale bot processing capability. The scheduler service 402 provides for virtual machine (VM) creation 404 and VM deployment 410. VM creation 404 permits selection of configuration settings 406 where a time can be specified when the scheduler service 402 creates a VM image (i.e. virtual device 415). VM creation 404 also permits selection of a template or blueprint that contains specification for the VM such as processing capability, and memory and storage size. A user may employ the VM deployment module 410 to schedule a particular bot to run on an n number of VMs (for example n=100). Embodiments disclosed herein support a category of VM termed herein an "ephemeral device" which is a device that exists only for the duration of bot execution. To deploy devices, the scheduler at 412 determines if one or more of the devices requested to be deployed is an ephemeral device. If not, then deployment service 414 deploys the requested device(s). If a requested device is determined at 412 to be an ephemeral device then predeployment service 416 is employed to create the requested ephemeral device(s) in accordance with criteria specified by way of a blueprint that specifies required processing capabilities, storage capabilities and software requirements, such as application programs required to be installed on the ephemeral device. These ephemeral devices will then show-up as devices connected and available—these devices would then be associated with bot deployment metadata. Deployment service is then employed to deploy the ephemeral device(s). The bot farm engine 418 is a service that enables creating virtual machines on-demand using a native Application Program Interface (API) provided by a cloud provider. It instantiates VM's that can then be used to run/play the bots. The bot farm engine 418 uses templates or blueprints (pre-generated) that define the configuration of the VM that needs to be created. These VM's are virtual devices for playing the bots. On completion of the execution of the bots, the user session manager 124 from the respective devices indicate the completion, and control room 108 can then reclaim the virtual machines by spinning them down and closing them.

Figure 5:
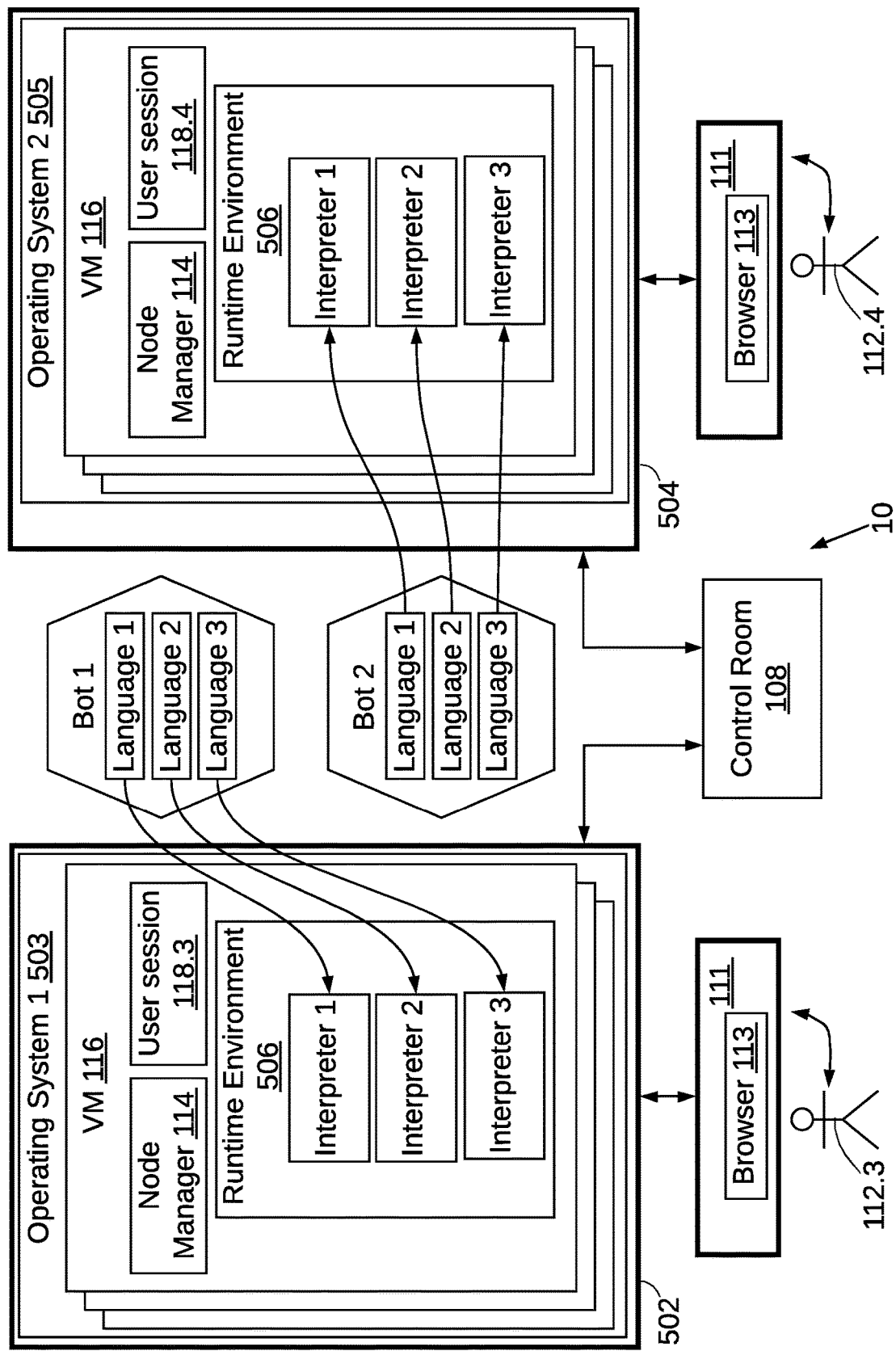
FIG. 5 illustrates a second embodiment of the RPA system of FIG. 1.

FIG. 5 illustrates a second embodiment of the RPA system of FIG. 1 which operates to provide a generalized runtime environment for digital workers. This flexible runtime environment advantageously permits extensibility of the platform to enable use of various languages in encoding bots. In the embodiment of FIG. 5, RPA system 10 operates in the manner described in connection with FIG. 1 and its accompanying figures, except that in the embodiment of FIG. 5, some or all of the user sessions 118 execute within a virtual machine 116. This permits the bots 104 to operate on an RPA system 10 that runs on an operating system different from an operating system on which a bot 104 may have been developed. For example, if a bot 104 is developed on the Windows® operating system, the platform agnostic embodiment of FIG. 5 permits bot 104 to be executed on a device 502 or 504 executing an operating system, 503/505 different than Windows®, such as for example, Linux. In one embodiment the VM 116 takes the form of a Java Virtual Machine (JVM) such as provided by the Oracle Corporation. As will be understood by those skilled in the art in view of the present disclosure, a JVM enables a computer to run Java® programs as well as programs written in other languages that are also compiled to Java® bytecode.

In the embodiment of FIG. 5, multiple devices 502 execute operating system 1, 503, which may for example be a Windows® operating system. Multiple devices 504 execute operating system 2, 505, which may for example be a Linux® operating system. For simplicity of explanation, two different operating systems are shown, by way of example and additional operating systems such as the macOS®, or other operating systems may also be employed on devices 503, 505 or other devices. Each device 503, 505 has installed therein one or more VM's 116, each of which executes its own operating system (not shown), which may be the same or different than the host operating system 503/505. Each VM 116 has installed upon it, either in advance, or on demand from control room 108, a node manager 114. Except as specifically noted herein, the embodiment of FIG. 5 operates as described above in connection with FIGS. 1, 2, 3A, 3B, 3C, 3D, 3E, 3F and 4 and reference is made to those figures and accompanying description for the detailed operation of control room 108, node manager 114 and user sessions 118 and user session manager 124. The embodiment of FIG. 5 differs from that in FIG. 1 in that the devices 502 and 504 have installed thereon one or more VMs 116 as described above, with each VM 116 having installed thereon an operating system that may or may not be compatible with an operating system required by an automation task. Moreover, each VM has installed thereon a runtime environment 506, each of which has installed thereon one or more interpreters (shown as interpreter 1, interpreter 2, interpreter 3). Three interpreters are shown by way of example but any run time environment 506 may at any given time have installed thereupon less than or more than three different interpreters. Each interpreter 506 is specifically encoded to interpret instructions encoded in a particular programming language. For example, interpreter 1 may be encoded to interpret software programs encoded in the Java® programming language, seen as language 1 in Bot 1 and Bot 2. Interpreter 2 may be encoded to interpret software programs encoded in the Python® programming language, seen as language 2 in Bot 1 and Bot 2, and interpreter 3 may be encoded to interpret software programs encoded in the R programming language, seen as language 3 in Bot 1 and Bot 2.

Turning to the bots Bot 1 and Bot 2, each bot may contain instructions encoded in one or more programming languages. In the example shown in FIG. 5, each bot contains instructions in three different programming languages, for example, Java®, Python® and R. This is for purposes of explanation and the embodiment of FIG. 5 may be able to create and execute bots encoded in more or less than three programming languages. The VMs 116 and the runtime environments 506 permit execution of bots encoded in multiple languages, thereby permitting greater flexibility in encoding bots. Moreover, the VMs 116 permit greater flexibility in bot execution. For example, a bot that is encoded with commands that are specific to an operating system, for example, open a file, or that requires an application that runs on a particular operating system, for example, Excel® on Windows®, can be deployed with much greater flexibility. In such a situation, the control room 108 will select a device with a VM 116 that has the Windows® operating system and the Excel® application installed thereon. Licensing fees can also be reduced by serially using a particular device with the required licensed operating system and application(s), instead of having multiple devices with such an operating system and applications, which may be unused for large periods of time.

Figure 6B:
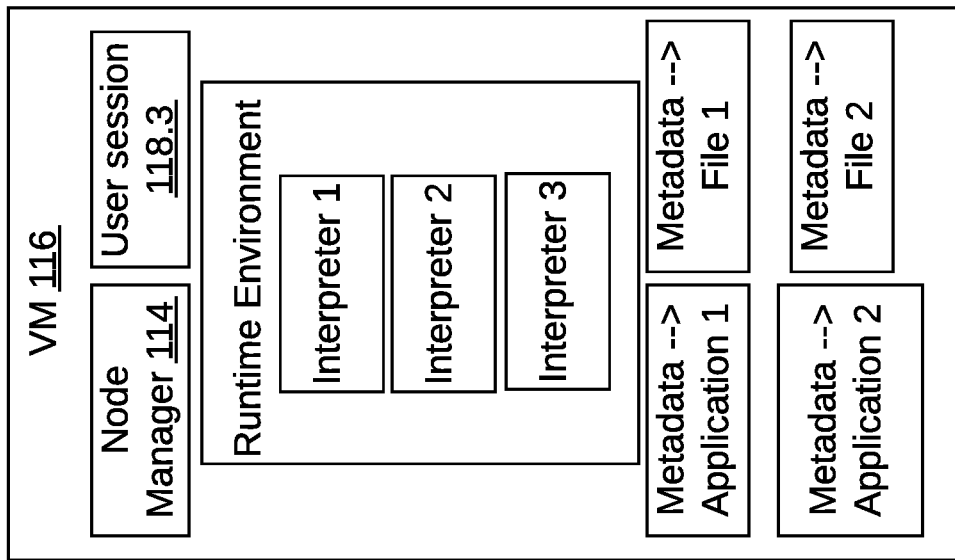
FIGS. 6A and 6B illustrate embodiments of virtual machine configurations.
Figure 6A:
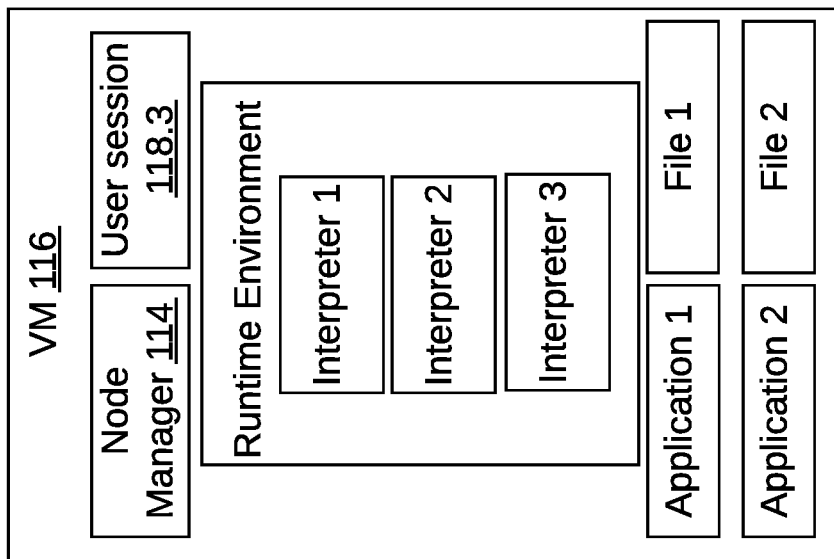

In one embodiment, seen in FIG. 6A the VM 116 may be pre-created with all dependencies, such as application 1, application 2, and two files, file 1 and file 2, that a bot 104 may need. In another embodiment, seen in FIG. 6B, the bot 104 may have all dependencies clearly defined as metadata in the bot definition to enable access to and/or retrieval of required resources such as applications (application 1, application 2), files (file 1, file 2), and access information (e.g. login credentials) to various services. Deployment service 142 can use this metadata information to setup the environment. This permits the bot 104 to be more compact in size. The dependencies define resources or information needed for a bot to execute. For example, the bot it may need $3^{rd}$ party libraries, or certain configuration settings that are encoded in a separate file and that needs to be present at a location for the bot to consume and execute successfully. In certain embodiments, to manage and authorize bot execution within the confines of the node managers 114, the system 10 needs the ability to disallow bot execution via any other means. In such embodiments, a ClassLoader, as employed in the Java® programming language, within the generated code (as a preamble) is used to ping the local agent to dynamically load a class to execute. In case, this bot is executed elsewhere, the call to ClassLoader will fail preventing the bot from execution. This is to prevent the generated byte code being executed independently external to the bot runner/player. Given that the bot is encoded in Java Byte code, it is desirable to prevent any external Java® runtime virtual machine from directly executing the byte code.

Figure 7:
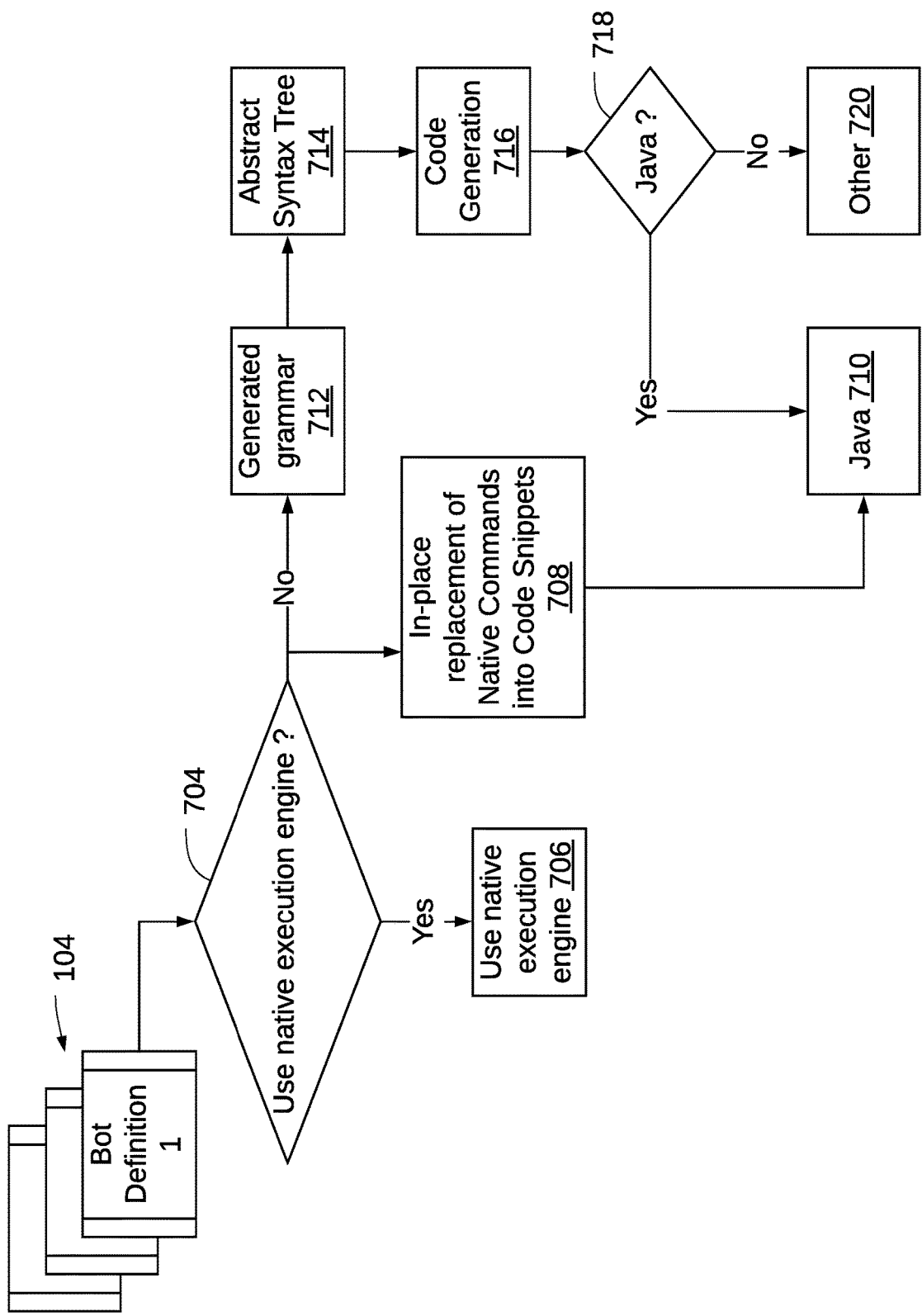
FIG. 7 illustrates an embodiment of code translation that may be employed by the embodiment of the RPA system in FIG. 5.

The code in a bot 104 that is encoded in a language other than Java® may be converted by the control room 108 to Java®, or another language, in the manner set shown in FIG. 7. For example, if a bot 104 is encoded with commands suitable for the Windows® operating system, the operations shown in FIG. 7 can be employed by the RPA system 10 to convert the bot to Java®, or another language to enable the bot 104 to execute on an operating system other than Windows®. In FIG. 7, a test is performed at 704 to determine if a bot 104 selected for execution should be executed by a native execution engine, in other words, if the bot 104 can be executed without translation of its encoded instructions. In one embodiment, the control room automatically makes a determination as to whether to use a native execution engine 706. In such an embodiment, if the control room 108 has the capability to execute the bot 104 natively then it employs the native execution capability. If the control room 108 does not have the capability to execute the bot 104 natively then the instructions in the bot 104 may be converted in two different ways. One conversion technique is shown at 708 where an in-place replacement of native commands with Java® code snippets is performed. This involves a straightforward replacement of a native command for a first platform, e.g. Windows®, into a code snippet for a second platform, e.g. Java®. In some embodiments, the control room 108 may have the capability to perform translation by way of an alternative technique seen at 712, 714, 716, 718 and 720, which permits translation into a language other than Java® if needed. In such an embodiment, such a translation will be the default unless overridden by an administrator or user 102. The instructions in the bot 104 are deconstructed at 712 and mapped at 714 to an abstract syntax tree and then generated to target code at 716 and 718 into Java® 710 or some other code 720 The abstract syntax tree is a data structure for representing bot instructions in a language neutral form and is machine readable. This allows for bot creation to be independent or agnostic of the language in which it needs to be executed. In the event that new commands are added, the corresponding commands and the associated snippet can be obtained by the control room 108 on demand by from a centralized repository that distributes new commands, such as for example from GitHub.com hosted by Automation Anywhere, Inc.

Figure 8:
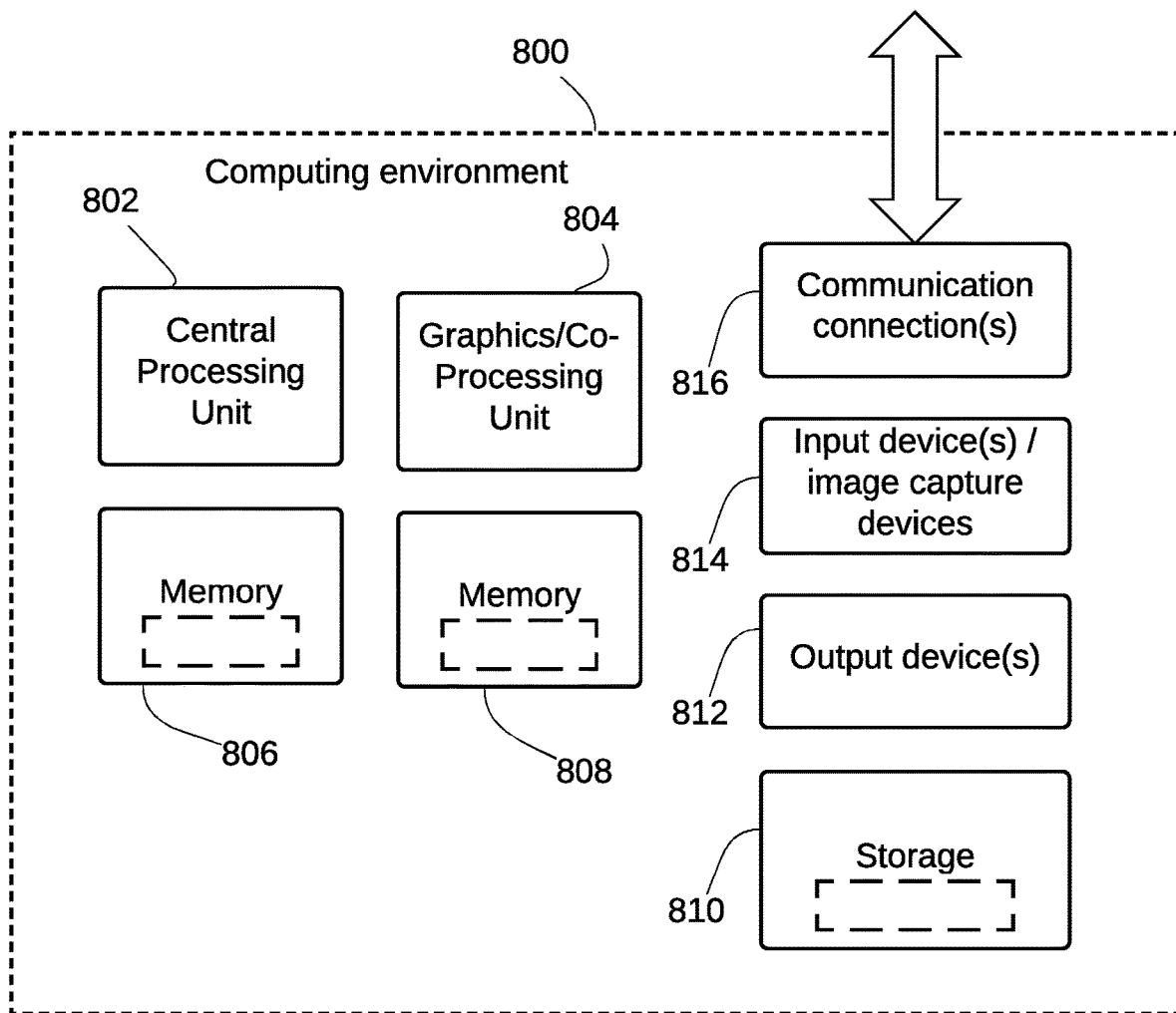
FIG. 8 illustrates a block diagram of hardware that may be employed in an implementation of the RPA systems disclosed herein.

FIG. 8 illustrates a block diagram of hardware that may be employed in an implementation of the RPA system as disclosed herein. FIG. 8 depicts a generalized example of a suitable general-purpose computing system 800 in which the described innovations may be implemented in order to improve the processing speed and efficiency with which the computing system 800 operates to perform the functions disclosed herein. With reference to FIG. 8 the computing system 800 includes one or more processing units 802, 804 and memory 806, 808. The processing units 802, 806 execute computer-executable instructions. A processing unit can be a general-purpose central processing unit (CPU), processor in an application-specific integrated circuit (ASIC) or any other type of processor. The tangible memory 806, 808 may be volatile memory (e.g., registers, cache, RAM), non-volatile memory (e.g., ROM, EEPROM, flash memory, etc.), or some combination of the two, accessible by the processing unit(s). The hardware components in FIG. 8 may be standard hardware components, or alternatively, some embodiments may employ specialized hardware components to further increase the operating efficiency and speed with which the system 100 operates. The various components of computing system 800 may be rearranged in various embodiments, and some embodiments may not require nor include all of the above components, while other embodiments may include additional components, such as specialized processors and additional memory.

Computing system 800 may have additional features such as for example, storage 810, one or more input devices 814, one or more output devices 812, and one or more communication connections 816. An interconnection mechanism (not shown) such as a bus, controller, or network interconnects the components of the computing system 800. Typically, operating system software (not shown) provides an operating system for other software executing in the computing system 800, and coordinates activities of the components of the computing system 800.

The tangible storage 810 may be removable or non-removable, and includes magnetic disks, magnetic tapes or cassettes, CD-ROMs, DVDs, or any other medium which can be used to store information in a non-transitory way, and which can be accessed within the computing system 800. The storage 810 stores instructions for the software implementing one or more innovations described herein.

The input device(s) 814 may be a touch input device such as a keyboard, mouse, pen, or trackball, a voice input device, a scanning device, or another device that provides input to the computing system 800. For video encoding, the input device(s) 814 may be a camera, video card, TV tuner card, or similar device that accepts video input in analog or digital form, or a CD-ROM or CD-RW that reads video samples into the computing system 800. The output device(s) 812 may be a display, printer, speaker, CD-writer, or another device that provides output from the computing system 800.

The communication connection(s) 816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

As seen from the foregoing description, a computer-implemented method is disclosed for executing automation tasks, which automate application level tasks as if the application level tasks were performed by a human user. A request initiated by a first user by way of a first device to perform a first automation task which comprises a sequence of application level tasks encoded in a first software robot is responded to by providing to the first device a first node manager that when executed on the first device implements a first user session that provides a context within which the software robot executes. The first software robot is caused to be provided to the first device. Logging data indicative of status of processing of the first automation task from the first node manager is received. In certain embodiments, the computer-implemented method also includes permitting an authorized administrator to suspend, terminate and restart execution of the first automation task. The computer-implemented method may also comprise responding to a request initiated by a second user by way of a second device to perform a second automation task by a second software robot, by providing to a third device a second node manager that when executed on the third device implements a second user session that provides a context within which the second software robot executes, and that provides an interface to the second user by way of the second device to view and control the second automation task. The second software robot is permitted to be provided to the third device. Logging data indicative of status of processing of the second automation task from the second node manager is received. The computer-implemented method may further comprise determining if the second device has the capability to perform the second automation task and providing to the third device the second node manager if the second device does not have the capability to perform the second automation task. The computer-implemented method may further comprise determining if the second device has the capability to perform the second automation task by scanning the second automation task to identify resources and capabilities required to perform the second automation task and comparing the resources and capabilities required to perform the second automation task with resources and capabilities of the second device where the resources and capabilities of the second device comprise determining if the second device employs an operating system that is compatible with the application level tasks encoded in a second software robot. In certain embodiments, the third device has installed thereupon, a virtual machine that employs an operating system compatible with the application level tasks encoded in a second software robot. In certain embodiments, an authorized administrator has the capability to suspend, terminate and restart execution of the second automation task.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A robotic process automation system comprising:
    data storage for storing,
        a plurality of sets of task processing instructions, each set of task processing instructions operable to interact at a user level with one or more designated user level application programs; and
        a plurality of work items, each work item stored for subsequent processing by executing a corresponding set of task processing instructions of the plurality of sets of task processing instructions; and
    a server processor operatively coupled to the data storage and configured to execute instructions that when executed cause the server processor to respond to a request issued by a user from a first client device to perform at least a first automation task to process at least a first work item from the plurality of work items, by:
        providing to the first client device, software code to implement a first node manager that executes on the first client device, wherein the first node manager further initiates on the client device to manage the first automation task;
        causing retrieval of the set of task processing instructions that corresponds to the first work item,
        interacting with the first client device which executes the set of task processing instructions that corresponds to the first work item; and
        receiving, from the first node manager, status data indicative of status of processing of the first work item.

2. The robotic process automation system of claim 1 wherein the server processor is further configured to execute instructions that when executed cause the server processor to respond to a request issued from a second client device to perform a second automation task to process a second work item from the plurality of work items by:
    initiating a virtual machine on a third client device;
    providing to the virtual machine on the third client device, software code to implement a second node manager that executes on the third client device, wherein the second node manager further initiates within the virtual machine on the third client device, a second user session to manage the second automation task;
    causing retrieval of the set of task processing instructions that corresponds to the second work item, the retrieval of the set of task processing instructions that corresponds to the second work item being from the data store;
    interacting with the third client device which executes the set of task processing instructions that corresponds to the second work item; and
    receiving, from the second node manager, status data indicative of status of processing of the second work item.

3. The robotic process automation system of claim 1 wherein the server processor is further configured to execute instructions that when executed cause the server processor to receive from a health service, that operates in the first node manager to generate a portion of the status data indicative of status of processing of the first work item.

4. The robotic process automation system of claim 3 wherein, the status data comprises a log of details of execution of the set of task processing instructions that correspond to the first work item.

5. The robotic process automation system of claim 3 wherein the status data comprises details of memory and processor utilization of memory and a processor in the first client device.

6. The robotic process automation system of claim 1 wherein the node manager implements a debugger that permits stepping through the task processing instructions that correspond to the first work item to permit debugging of the task processing instructions that correspond to the first work item.

7. The robotic process automation system of claim 1 wherein the node manager implements a launcher that reads metadata associated with the task processing instructions that correspond to the first work item, launches a container within which the task processing instructions that correspond to the first work item are to be executed, and initiates execution of the task processing instructions that correspond to the first work item that are within the container.

8. The robotic process automation system of claim 1 wherein the node manager implements a player that executes task processing instructions that correspond to the first work item.

9. The robotic process automation system of claim 1 wherein the node manager implements a proxy service that enables integration of external software or applications with the task processing instructions that correspond to the first work item.

10. The robotic process automation system of claim 1 wherein the node manager implements one or more virtual machines, wherein each of the virtual machines is configured to execute instructions encoded in a particular language.

11. The robotic process automation system of claim 1 wherein the node manager implements a login service that logs into computerized services and applications with credentials associated with a user to permit the node manager to perform the first automation task with credentials associated with the user.

12. A computer program product for supporting automation tasks, which automate application-level tasks as if such application-level tasks were performed by a human user, the computer program product stored on a non-transitory computer readable storage medium and including instructions for causing a computer system to execute a method for executing automation tasks, the method comprising the actions of:
    receive a request from a first client device to perform at least a first automation task to process at least a first work item from a plurality of work items, wherein the first work item is a first electronic document and the first automation task operates to process at least the first electronic document in an automated manner;

providing to the first client device, software code to implement a first node manager that executes on the first client device, wherein the first node manager further initiates on the client device to manage the first automation task;

causing retrieval of a set of task processing instructions that corresponds to the first work item, interacting with the first client device which executes the set of task processing instructions that corresponds to the first work item; and receiving, from the first node manager, status data indicative of status of processing of the first work item.

13. The computer program product of claim 12 wherein the method further comprises:

receive a request from a second client device to perform at least a second automation task to process at least a second work item from the plurality of work items;

initiating a virtual machine on a third client device;

providing to the virtual machine on the third client device, software code to implement a second node manager that executes on the third client device, wherein the second node manager further initiates, within the virtual machine on the third client device, a second user session to manage the second automation task;

causing retrieval of the set of task processing instructions that corresponds to the second work item;

interacting with the third client device which executes the set of task processing instructions that corresponds to the second work item; and receiving, from the second node manager, status data indicative of status of processing of the second work item.

14. The computer program product of claim 12 wherein, the status data comprises a log of details of execution of the set of task processing instructions that correspond to the first work item.

15. The computer program product of claim 12 wherein the status data comprises details of memory and processor utilization of memory and a processor in the first client device.

16. The computer program product of claim 12 wherein the first node manager implements a debugger that permits stepping through the task processing instructions that correspond to the first work item to permit debugging of the task processing instructions that correspond to the first work item.

17. The computer program product of claim 12 wherein the first node manager implements a launcher that reads metadata associated with the task processing instructions that correspond to the first work item, launches a container within which the task processing instructions that correspond to the first work item are to be executed, and initiates execution of the task processing instructions that correspond to the first work item that are within the container.

18. The computer program product of claim 12 wherein the first node manager implements a player that executes task processing instructions that correspond to the first work item.

19. The computer program product of claim 12 wherein the first node manager implements a proxy service that enables integration of external software or applications with the task processing instructions that correspond to the first work item.

20. The computer program product of claim 12 wherein the first node manager implements one or more virtual machines, wherein each of the virtual machines is configured to execute instructions encoded in a particular language.

21. The computer program product of claim 12 wherein the first node manager implements a login service that logs into computerized services and applications with credentials associated with a user to permit the node manager to perform the first automation task with credentials associated with the user.

22. A computer program product for supporting automation tasks, which automate application-level tasks as if such application-level tasks were performed by a human user, the computer program product stored on a non-transitory computer readable storage medium and including instructions for causing a computer system to execute a method for executing automation tasks, the method comprising the actions of:

provide a plurality of sets of task processing instructions;

receive a request from a first client device to perform at least an automation task to process at least a work item from the plurality of work items;

initiating a virtual machine on a second client device;

providing to the virtual machine on the second client device, software code to implement a node manager that executes on the second client device, wherein the node manager initiates, within the virtual machine on the second client device, to manage the automation task;

causing retrieval of a set of task processing instructions that corresponds to the work item, the set of task processing instructions being retrieved being chosen from the plurality of sets of task processing instructions;

interacting with the second client device which executes the set of task processing instructions that corresponds to the work item; and receiving, from the first node manager, status data indicative of status of processing of the second work item.

* * * * *